Sept. 11, 1956     J. E. LATTA     2,762,828
METHOD FOR TREATMENT OF HYDROCARBON SYNTHESIS CATALYST
Filed July 3, 1952
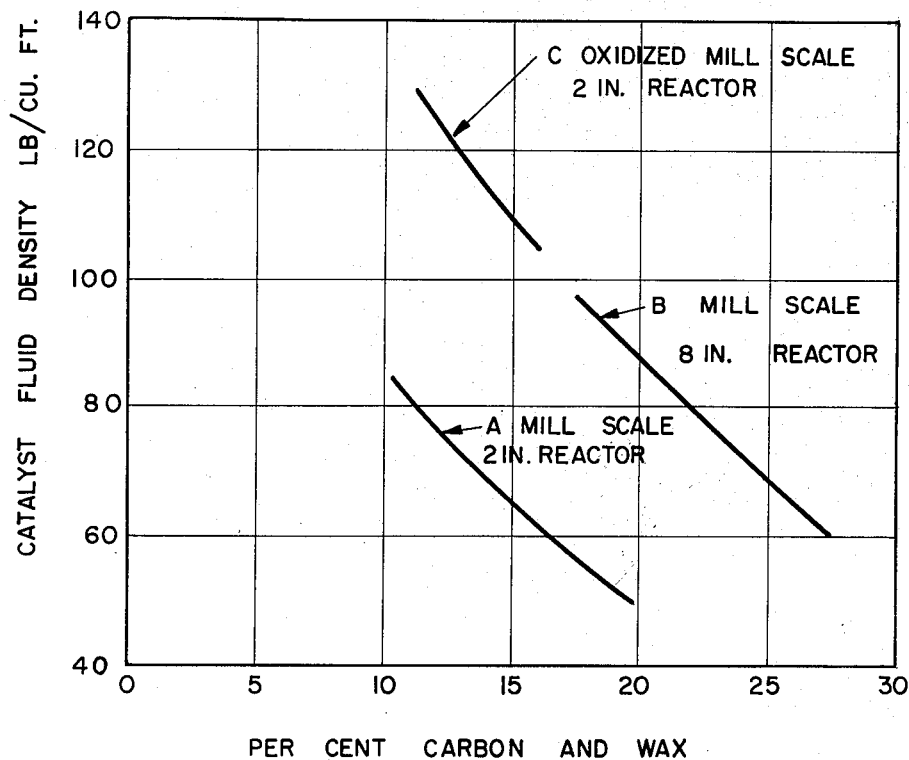
INVENTOR.
JAMES E. LATTA
BY
ATTORNEY

2,762,828

METHOD FOR TREATMENT OF HYDROCARBON SYNTHESIS CATALYST

James E. Latta, Tulsa, Okla., assignor to Stanolind Oil and Gas Company, Tulsa, Okla., a corporation of Delaware Application July 3, 1952, Serial No. 297,016

6 Claims. (Cl. 260—449.6)

The present invention relates to the synthesis of hydrocarbons by the reduction of carbon monoxide with hydrogen in the presence of a fluidized iron-type catalyst. More particularly, it pertains to a method for preparing a catalyst of the aforesaid type having improved fluidization properties, ability to produce relatively high yields of desired oxygenated products, and increased resistance to fragmentation.

One of the chief problems in adapting the Fischer-Tropsch synthesis to fluid bed technique has been the difficulty experienced in providing conditions favorable to the maintenance of a substantially uniform catalyst bed over extended periods. Generally, after a relatively short time under synthesis conditions, it was found that excessive quantities of carbon formed on the catalyst and that the latter subsequently disintegrated into particles of much smaller diameter. The original mass of iron particles which once possessed good fluidization characteristics became difficultly fluidizable and passed on out of the reactor system causing the synthesis operation to be discontinued. In an effort to overcome this mechanical difficulty, it has been suggested that sand, dolomite, alumina, silica gel, etc., of suitable particle size, be mixed with the iron catalyst in order to maintain constant the essential fluidization characteristics of the catalyst bed. Such conditions, however, brought about classification of particles of catalyst and of inert material in the fluidized bed and, moreover, this procedure did not solve the fundamental problem of carbon deposition on the catalyst. It has also been proposed to circulate the catalyst from the reactor to a "stripping" vessel where treatment with hydrogen or synthesis gas at lower pressures and higher temperatures would remove higher boiling material from the catalyst surface and thus increase its useful life. Numerous other procedures have likewise been proposed, either for the prevention of carbon deposition or for regenerating the catalyst in useful form; but so far as I am aware, they have all possessed one or more material defects which have made them commercially unattractive. An additional problem in connection with the profitable operation of the Fischer-Tropsch synthesis has been the selection of a catalyst which will not only give high total feed carbon monoxide conversions, but which will produce good yields of oxygenated chemicals having a high proportion of the class or classes of chemicals most desired.

Accordingly, it is an object of my invention to provide a hydrocarbon synthesis catalyst having improved operating characteristics, including resistance to fragmentation and carbon deposition, high total feed carbon monoxide conversions and high selectively to the desired class or classes of water- and oil-soluble chemicals, by subjecting said catalyst, prior to the standard reduction treatment, to oxidizing conditions such that at least about 60 weight per cent of the iron present therein is in the form of $Fe_3O_4$.

In accordance with my invention I have found the iron-type hydrocarbon synthesis catalyst such as, for example, iron mill scale, which contains from about 60 to about 65 weight per cent FeO and from about 35 to about 40 weight per cent $Fe_3O_4$ prior to reduction, can be converted into a catalyst having highly desirable characteristics if the unreduced material from which the catalyst is normally prepared is first oxidized under conditions such that the $Fe_3O_4$ content thereof is increased to a total of at least 60 weight per cent. The desired catalyst is then obtained by reduction of the highly oxidized material with a suitable reducing gas such as hydrogen.

In carrying out a preferred embodiment of my invention, ordinary iron mill scale is first ground and screened, after which a selected portion from the aforesaid grinding and screening operation is impregnated with a suitable alkali metal promoter such as, for example, potassium, in the form of an aqueous solution of potassium carbonate to give a concentration on the catalyst of from about 0.5 to about 2.0 per cent as the alkali metal oxide. Oxidation of the resulting impregnated iron oxide to a product which is predominantly $Fe_3O_4$ is effected by subjecting said impregnated oxide to the action of air or equivalent oxidizing medium under pressures of from about 100 to about 555 p. s. i., preferably from 200 to 300 p. s. i. and at temperatures of from about 500° to about 800° F., preferably from 650° to 750° F. Oxidation is continued under these conditions preferably until 80 to about 90 weight per cent of the mass is composed of $Fe_3O_4$. Thereafter the system in which the oxidation occurs is flushed out under pressures of 150 to 400 p. s. i. with a suitable inert gas such as nitrogen, after which the latter is purged by the use of hydrogen under similar pressure conditions. After all of the nitrogen is removed in this manner, the oxidized mass is reduced preferably with hydrogen at temperatures ranging from about 200° to about 800° F., preferably from about 600° to about 700° F. and at pressures from about 200 to about 500 p. s. i. Completion of the reduction step is evidenced by the absence of water in the tail gas; however, it is generally desirable to continue treatment of the catalyst with hydrogen under the above-mentioned conditions for a period of from about two to ten hours after the presence of water can no longer be detected.

If desired, the catalyst may thereafter be subjected to an additional pretreatment or conditioning step involving fluidization of the catalyst particles in the reactor at a pressure of from about 350 to about 450 p. s. i. and at a temperature of from about 575° to about 700° F. The hydrogen and carbon monoxide present in the treating gas are in a ratio of about 2:1, the recycle ratio is from about 1.5 to 2.0, the space velocity may be from about 4.0 to about 8.0 S. C. F. H. CO (fresh feed)/lb. iron, and the linear velocity should be from about 0.5 to about 0.9 ft./sec. Treatment of this type, which may continue for a period of from about 15 to 25 hours, is generally carried out in all runs to insure the procurement in each instance of a catalyst having uniform performance characteristics. Hydrocarbon synthesis is then conducted under known conditions.

The advantages of using a catalyst prepared in accordance with my invention over conventional catalysts in hydrocarbon synthesis are specifically shown by the following example.

EXAMPLE I

Twenty-one pounds of iron mill scale containing approximately fifteen pounds of iron as the free metal, impregnated with 0.5 weight per cent $K_2O$, were charged to a hydrocarbon synthesis reactor, 2" I. D., having a reaction zone about 20 feet long. The reactor was then placed under an air pressure of 150 p. s. i. g., and over a period of 12 hours the temperature of the catalyst bed was increased from 100° to 600° F., and from 600° to 700° F. in the next 12 hours by circulating preheated air. When the temperature reached 700° F., the pressure was increased to 250 p. s. i. g. The operating conditions employed for oxidation of the catalyst were as follows:

| | 0–12 | 12–24 | 24–72 |
|---|---|---|---|
| Hours on stream | 0–12 | 12–24 | 24–72 |
| Catalyst Temperature, °F | 100–600 | 600–700 | 700 |
| Reactor pressure, p. s. i. g | 150 | 150 | 250 |
| Total Feed, SCFH | 280 | 280 | 450 |
| Recycle, SCFH | Total | Total | Total |
| Linear velocity, ft./sec | .75 | .75 | .75 |

Samples of catalyst were periodically withdrawn from the system and analyzed for $FeO$, $Fe_3O_4$ and $Fe$. The composition of the catalyst at various stages of the oxidation is indicated below.

Table 1

| Time, Hrs. | Percent FeO | Percent $Fe_3O_4$ | Percent Total Fe |
|---|---|---|---|
| Start | 55 | 25 | 73.65 |
| 62 | 23 | 69 | 73.76 |
| 86 | | 75 | |
| 110 | | 78 | |
| 130 | 14 | 81 | 73.48 |

After 130 hours oxidation was discontinued, the temperature decreased to 250° F., and the system flushed with nitrogen to remove all oxygen therefrom. Nitrogen was then purged from the system (under 250 p. s. i. g) with hydrogen by employing a flow rate of 450 S. C. F. H. After all nitrogen had been removed, the oxidized mass was subjected to reduction with hydrogen for a total of 61 hours under the conditions listed below.

| | 0 | 1–12 | 12–24 | 24–61 |
|---|---|---|---|---|
| Hours on stream | 0 | 1–12 | 12–24 | 24–61 |
| Catalyst Temperature, °F | 250 | 600 | 700 | 650 |
| Reactor pressure, p. s. i. g | 250 | 250 | 250 | 400 |
| Total Feed, S. C. F. H | 450 | 450 | 450 | 540 |
| Recycle, S. C. F. H | Total | Total | Total | Total |
| Linear velocity, ft./sec | .43 | .68 | .75 | .55 |

The concentration of hydrogen in the tail gas was maintained above 90 per cent, and the catalyst was allowed to remain in contact with hydrogen for 8 hours after water evolution had ceased. The reduced catalyst thus obtained contained 96.5 weight per cent iron as the free metal. This catalyst was next subjected to an activation or conditioning treatment for a period of 15 hours employing the following conditions:

| | |
|---|---|
| Hours | 0–15 |
| Fresh feed composition, $H_2$:CO ratio | 1.85–1.90 |
| Catalyst temperature, °F | 600 |
| System exit pressure, lb./sq. in | 400 |
| Fresh feed rate, S. C. F. H | 225 |
| Recycle ratio | 1.8 |
| Recycle rate, S. C. F. H | 405 |
| Space velocity, S. C. F. H. CO (FF)/lb. Fe inventory | 5.4 |
| Linear velocity, ft./sec | 0.6 |

At the end of the above-mentioned activation period, the conditions indicated below were employed until the run was discontinued.

EXAMPLE II

A second run in the same reactor was made employing mill scale catalyst under identical reduction, activation and synthesis conditions; however, the catalyst that was used had not been carried to a high level state of oxidation prior to reduction as was done in the preceding example (Run No. 1). The results obtained by synthesis with the two differently treated catalysts are listed in the table below:

Table II

RUN No. 1

| Test Period | 1 | 2 | 3 | 4 |
|---|---|---|---|---|
| Age, Hours | 45 | 69 | 143 | 190 |
| Total Feed CO Conversion | 93.7 | 93.6 | 92.2 | 93.1 |
| Selectivity to $C_{3+}$[1] | 62.2 | 61.1 | 63.7 | 65.2 |
| Selectivity to: | | | | |
| Water-Soluble Chemicals | 7.00 | 7.38 | 6.69 | 7.03 |
| Oil-Soluble Chemicals | 7.87 | 6.64 | 7.36 | 7.71 |
| Total Chemicals | 14.87 | 14.02 | 14.05 | 14.74 |
| Distribution of Chemicals: | | | | |
| Water-Soluble— | | | | |
| Carbonyls | 28.0 | 29.4 | 23.8 | 24.6 |
| Alcohols | 54.6 | 55.2 | 57.1 | 57.6 |
| Acids | 17.4 | 15.4 | 19.1 | 17.8 |
| Oil-Soluble— | | | | |
| Carbonyls | 37.5 | 35.2 | 35.9 | 35.8 |
| Alcohols | 38.4 | 40.7 | 40.6 | 41.0 |
| Acids | 19.8 | 20.0 | 19.2 | 19.1 |

RUN No. 2

| Test Period | 1 | 2 | 3 | 4 |
|---|---|---|---|---|
| Age, Hours | 18 | 40 | 64 | 90 |
| Total Feed CO Conversion | 91.8 | 91.8 | 93.1 | 91.6 |
| Selectivity to $C_{3+}$[1] | 55.9 | 54.2 | 53.1 | 51.0 |
| Selectivity to: | | | | |
| Water-Soluble Chemicals | 3.1 | 3.8 | 3.4 | 3.4 |
| Oil-Soluble Chemicals | 7.7 | 9.6 | 7.8 | 8.2 |
| Total Chemicals | 10.8 | 13.4 | 11.2 | 11.6 |
| Distribution of Chemicals: | | | | |
| Water-Soluble— | | | | |
| Carbonyls | 32.8 | 30.4 | 25.3 | 27.9 |
| Alcohols | 39.0 | 42.9 | 46.1 | 45.6 |
| Acids | 28.2 | 26.1 | 28.6 | 26.5 |
| Oil-Soluble— | | | | |
| Carbonyls | 52.2 | 40.1 | 37.2 | 40.3 |
| Alcohols | 14.5 | 24.2 | 29.1 | 25.9 |
| Acids | 33.3 | 35.7 | 33.6 | 33.8 |

[1] Includes hydrocarbons and all chemicals.

While it is to be noted from the data in the above table that the total chemicals obtained in Run No. 1 averaged about 2 per cent higher than that obtained in Run No. 2, the striking difference in the two runs is found in the distribution of these chemicals. Thus, in Run No. 1, the water-soluble alcohols were obtained in yields approximately 10 to 12 per cent higher than those obtained in Run No. 2, while the yields of oil-soluble alcohols in Run No. 1 averaged about 15 per cent higher than those secured in Run No. 2. It also is to be noted that the selectivity to $C_{3+}$ products was from about 7 to 14 per cent higher in Run No. 1 than in Run No. 2. This fact is particularly surprising since catalysts from the source which the mill scale in Run No. 2 was obtained normally give selectivities averaging from 1 to 2 per cent higher than mill scale catalyst from the source which that in Run No. 1 was secured.

The curves presented in the figure where fluid density is plotted versus per cent carbon and wax deposition demonstrates the advantageous characteristic of iron hydrocarbon synthesis catalyst prepared in accordance with my invention. With respect to resistance to carbon deposition over extended periods of time, curve A is based on the fluidization characteristics of an unoxidized mill scale catalyst similar to the catalyst of Run No. 2 and employed in a 2" reactor of the type used in that run under the conditions similar to those of Run No. 2. Curve B is based on data taken from a run in an 8" I. D. reactor having a reaction zone 20 feet long, using unoxidized mill scale catalyst. Normally for a given catalyst, better fluidization is experienced in the 8" reactor than in a 2"

reactor of equal length, owing to the greater rate of catalyst contamination with carbon and wax which occurs in the 2" reactor because of higher conversion. Thus, it may be seen from these curves that at equal carbon and wax contents the fluid density of the catalyst in the 2" reactor is substantially lower than that prevailing in the 8" reactor under otherwise equivalent conditions. Curve C, however, is based on data taken from Run No. 1, reported above, in which the catalyst was oxidized in accordance with the process of my invention prior to the reduction step. From this curve it is seen that not only is the carbon and wax deposition much less than was experienced in the runs on which curves A and B are based, but the fluid density of the catalyst is substantially higher than that observed in either of the previous runs. For these separate runs in which synthesis conditions were substantially identical, the fluidization characteristics and resistance to carbon and wax deposition exhibited by the catalyst prepared in accordance with my invention (curve C) are considered to be highly unexpected. Curves A and C are based on data taken over a 150 hour period, the first analysis being at the end of 50 hours. Curve B is based on data taken over a 630 hour period, the first analysis being at the end of 120 hours. Catalyst treated in accordance with my invention also exhibits a lesser tendency to elutriate than catalyst that has not been so treated. Elutriation or catalyst carry over is a phenomenon which occurs under any conditions of synthesis in which the catalyt is employed in the form of a fluidized bed. Generally, however, the extent to which this phenomenon occurs is directly dependent upon the amount of carbon deposition on the catalyst during synthesis. I have observed that regardless of the type of preliminary treatment given the catalyst, the rate of elutriation becomes substantially constant and reaches a minimum value after a period of about 50 hours. I have found, however, that with catalyst treated in accordance with my invention, the extent to which elutriation occurs is much less than that found in the case of catalysts prepared by prior art procedures. For example, in Run No. 2, discussed above, after 150 hours on stream, catalyst elutriation occurred to the extent of 25 weight per cent based on the catalyst originally charged; whereas, in Run No. 1, which used a catalyst prepared in accordance with the present invention, elutriation was found to have taken place only to the extent of about 8.9 weight per cent, based on the amount of the original charge, after 190 hours of operation. It is, of course, understood that during both of these runs, catalyst samples were periodically withdrawn for analysis, thus making the percentage elutriation high in both cases; however, on a relative basis, these results indicate that elutriation in the case of the catalyst not treated in accordance with my invention occurred to a much greater extent than that found in the run employing a catalyst which had been so treated.

While my invention has been described in connection with the specific examples enumerated above, it should be underseood that it is not limited thereto. The data appearing in these examples clearly indicate that hydrocarbon synthesis catalyst treated in accordance with the process of my invention possesses extremely desirable operating characteristics as well as the ability to give high total feed carbon monoxide conversions with high selectivities to the desired class or classes of oxygenated chemicals. Likewise it will be appreciated that although I have described the application of my invention to catalysts derived from iron mill scale, it is of course understood that my process is similarly applicable to the preparation of iron hydrocarbon synthesis catalysts derived from other sources. Moreover, the order in which oxidation of the catalyst and impregnation of a promoter thereon is not considered critical. Generally, however, I prefer to carry out the preliminary oxidation step prior to impregnating the catalyst with a promoter.

I claim:

1. A process for the production of hydrocarbons by the reduction of carbon monoxide with hydrogen in the presence of a bed of fluidized iron catalyst in accordance with known conditions, said catalyst having been prepared by first subjecting a mixture of finely divided iron mill scale particles and from about 0.5 to about 2.0 weight per cent of alkali metal oxide, a major portion of said particles being in the form of a lower iron oxide, to oxidation with a gas containing free oxygen at a temperature of from about 500° to about 800° F. and at pressures of from about 100 to about 555 p. s. i. until the total $Fe_3O_4$ content of the resulting oxidized mass is at least about 60 weight per cent, and thereafter reducing said oxidized mass with hydrogen at a temperature ranging from about 200° to about 800° F. and at pressures of from about 200 to about 555 p. s. i. until water is no longer formed in the reduction step.

2. A process for the production of hydrocarbons by the reduction of carbon monoxide with hydrogen in the presence of a bed of fluidized iron catalyst in accordance with known conditions, said catalyst having been prepared by first subjecting finely divided iron mill scale particles, a major portion of said particles being in the form of a lower iron oxide, to oxidation with a gas containing free oxygen at a temperature of from about 500° to about 800° F. and at pressures of from about 100 to about 555 p. s. i. until the total $Fe_3O_4$ content of the resulting oxidized mass is at least about 60 weight per cent, impregnating said mass with from about 0.5 to about 2.0 weight per cent of an alkali metal oxide, and thereafter reducing said oxidized mass with hydrogen at a temperature ranging from about 200° to about 800° F. and at pressures of from about 200 to about 500 p. s. i. until water is no longer formed in the reduction step.

3. A catalyst for the synthesis of hydrocarbons from carbon monoxide and hydrogen prepared by subjecting finely divided iron mill scale particles, a major portion of which is in the form of a lower iron oxide, to oxidation with a gas containing free oxygen at a temperature of from about 500° to about 800° F. and at pressures of from about 100 to about 555 p. s. i. until the total $Fe_3O_4$ content of the resulting oxidized mass is at least about 60 weight per cent, impregnating said mass with from about 0.5 to about 2.0 weight per cent of an alkali metal oxide, and thereafter reducing said oxidized mass with hydrogen at a temperature ranging from about 200° to about 800° F. and at pressures of from about 200 to about 500 p. s. i. until water is no longer formed in the reduction step.

4. A catalyst for the synthesis of hydrocarbons from carbon monoxide and hydrogen prepared by subjecting finely divided iron mill scale to oxidation with a gas containing free oxygen at a temperature of from about 500° to about 800° F. and at pressures of from about 100 to 555 p. s. i. until the total $Fe_3O_4$ content of the resulting oxidized mass is at least about 60 weight per cent, impregnating said mill scale with from about 0.5 to about 2.0 weight per cent of an alkali metal, and thereafter reducing said oxidized mass with hydrogen at a temperature of from about 200° to about 800° F. and at a pressure of from about 200 to about 500 p. s. i. until reduction is substantially complete.

5. The catalyst of claim 4 in which the alkali metal employed is potassium oxide.

6. A catalyst for the synthesis of hydrocarbons from carbon monoxide and hydrogen prepared by subjecting finely divided iron mill scale particles to oxidation with a gas containing free oxygen at a temperature of from about 500° to about 800° F. and at pressures of from about 100 to about 555 p. s. i. until the total $Fe_3O_4$ content of the resulting oxidized mass is at least about 60 weight per cent, impregnating said mass with from about 0.5 to about 2.0 weight per cent of an alkali metal oxide, and thereafter reducing said oxidized mass with hydrogen at a temperature ranging from about 200° to about 800° F. and at pressures of from about 200 to about 500 p. s. i. until water is no longer formed in the reduction step.

References Cited in the file of this patent

UNITED STATES PATENTS

| | | |
|---|---|---|
| 2,365,094 | Michael et al. | Dec. 12, 1944 |
| 2,438,584 | Stewart | Mar. 30, 1948 |
| 2,462,861 | Gunness | Mar. 1, 1949 |
| 2,483,512 | Voorhies, Jr., et al. | Oct. 4, 1949 |
| 2,530,344 | Watts | Nov. 14, 1950 |
| 2,583,254 | Clark | Jan. 22, 1952 |
| 2,636,011 | Clark | Apr. 21, 1953 |
| 2,661,338 | Lanning | Dec. 1, 1953 |
| 2,690,449 | Watson | Sept. 28, 1954 |